March 30, 1954　　　W. A. WARD　　　2,673,777
DISPENSING CAP FOR CONTAINERS
Filed Aug. 15, 1949　　　　　　　　　　　3 Sheets-Sheet 2
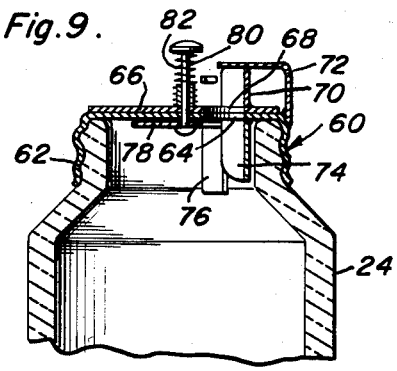
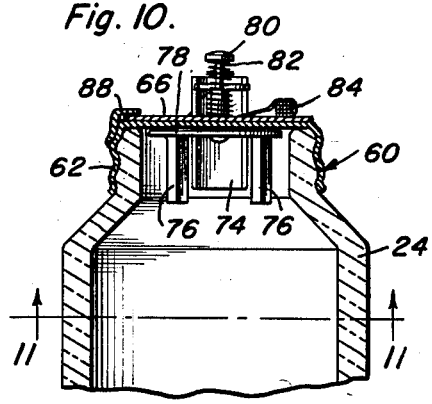
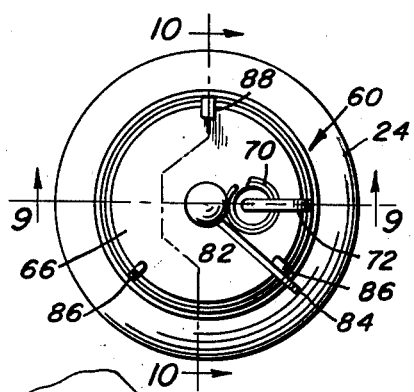
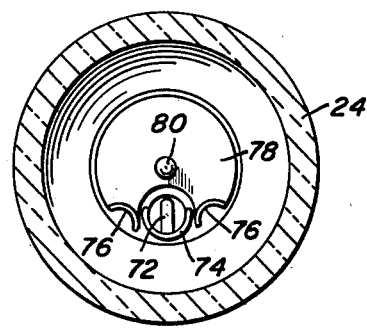
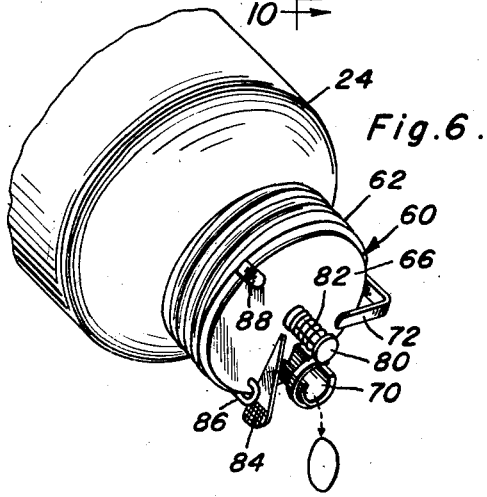
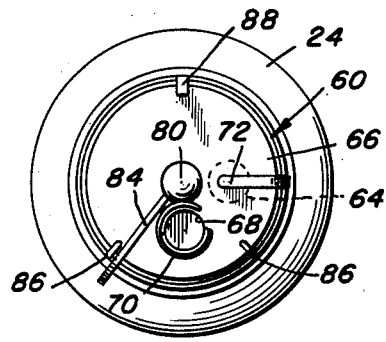
Wayne A. Ward
INVENTOR.

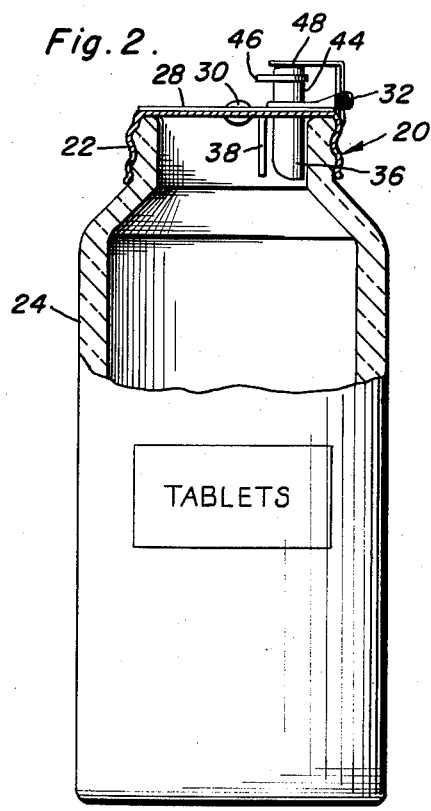
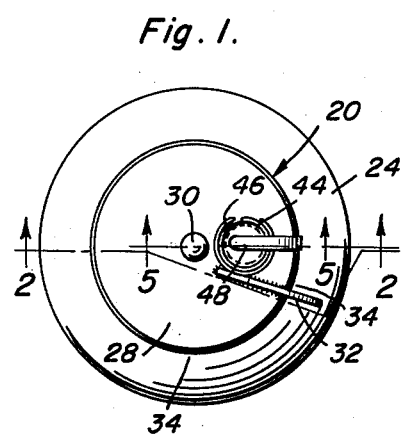
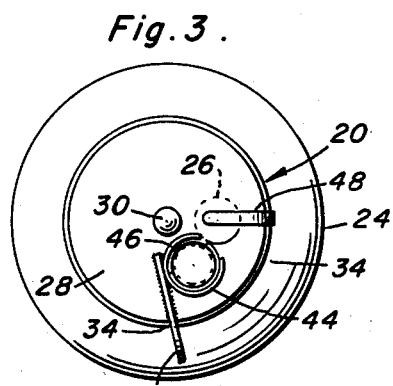
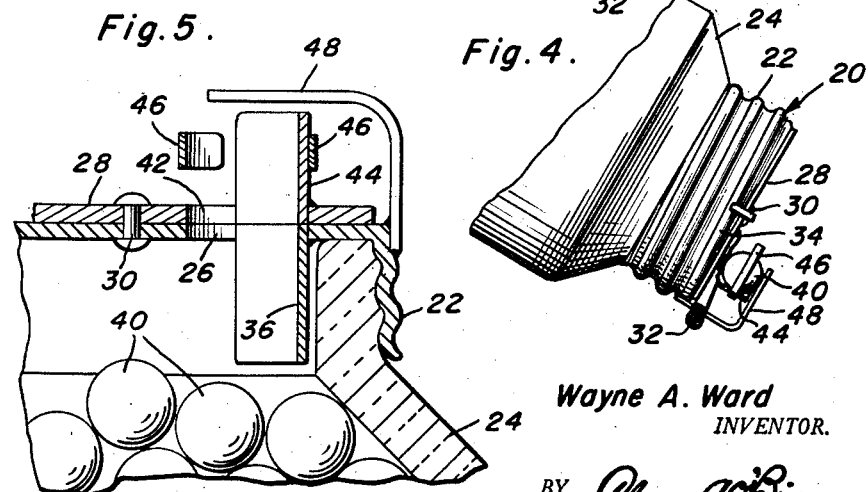
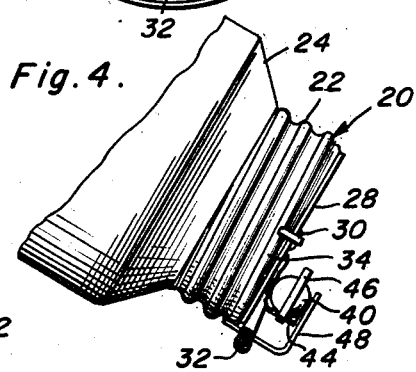
Wayne A. Ward
INVENTOR.

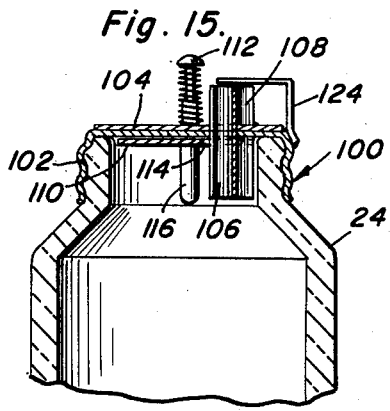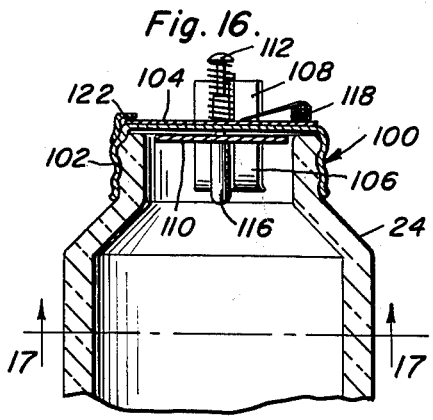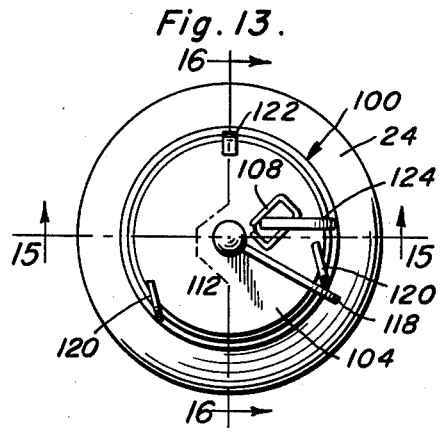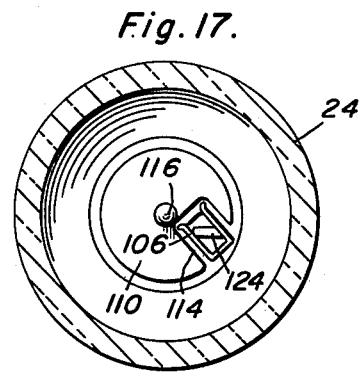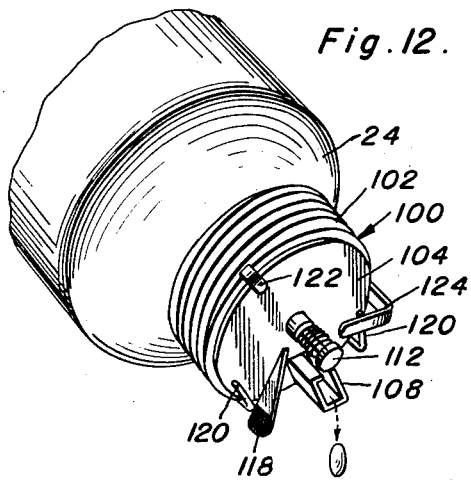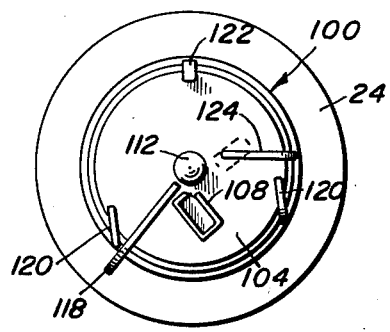

Patented Mar. 30, 1954

2,673,777

UNITED STATES PATENT OFFICE 2,673,777

DISPENSING CAP FOR CONTAINERS

Wayne A. Ward, Watertown, N. Y.

Application August 15, 1949, Serial No. 110,363

3 Claims. (Cl. 312—89)

This invention relates to new and useful improvements and structural refinements in dispensing caps, and the principal object of the invention is to facilitate convenient and expeditious dispensing of tablets, capsules, etc. from bottles or similar containers, this being accomplished with the use of only one hand.

This object is carried out by the provision of a dispensing cap equipped with an outlet opening communicating with an outlet passage, there being provided a closure on the outlet opening and means for guiding tablets or capsules through the opening into the outlet passage when the closure is in its open position, so that the contents of the bottle on which the dispensing cap is mounted may be readily discharged by simply opening the closure with the same hand by which the bottle is held.

An important feature of the invention lies in the provision of means for retaining a tablet or capsule in the outlet passage while the closure is open, that is, until such time as the closure is again closed, thus providing automatic means or "counting device" to assure that only one tablet or capsule is dispensed at one time.

Another feature of the invention resides in the provision of agitating means on the dispensing cap, whereby the capsules or tablets in the bottle may be urged toward and into the outlet opening.

Some of the advantages of the invention reside in its simplicity of construction, in its convenient and expeditious operation, and in its adaptability to economical manufacture.

With the above more important objects and features in view, and such other objects and features as may become apparent as this specification proceeds, the invention consists essentially of the arrangement and construction of parts as illustrated in the accompanying drawings, in which:

Figure 1 is a top plan view of the invention applied to a bottle, the dispensing cap being shown in its open position;

Figure 2 is a cross sectional view, taken substantially in the plane of the line 2—2 in Figure 1;

Figure 3 is a top plan view, similar to that shown in Figure 1, but illustrating the invention in its closed position;

Figure 4 is a fragmentary side elevational view showing the bottle and the invention tipped during the dispensing operation;

Figure 5 is a cross sectional detail, taken substantially in the plane of the line 5—5 in Figure 1;

Figure 6 is a fragmentary perspective view of a modified embodiment of the invention;

Figure 7 is a top plan view of the embodiment shown in Figure 6, illustrating the dispensing cap in the open position;

Figure 8 is a top plan view, similar to that shown in Figure 7, but showing the dispensing cap closed;

Figure 9 is a cross sectional view, taken substantially in the plane of the line 9—9 in Figure 7;

Figure 10 is a cross sectional view, taken substantially in the plane of the line 10—10 in Figure 7;

Figure 11 is a cross sectional view, taken substantially in the plane of the line 11—11 in Figure 10;

Figure 12 is a fragmentary perspective view of a further modified embodiment of the invention;

Figure 13 is a top plan view of the embodiment shown in Figure 12, and illustrating the same in its open position;

Figure 14 is a top plan view, similar to that shown in Figure 13, but illustrating the dispensing cap closed;

Figure 15 is a cross sectional detail, taken substantially in the plane of the line 15—15 in Figure 13;

Figure 16 is a cross sectional view, taken substantially in the plane of the line 16—16 in Figure 13; and Figure 17 is a cross sectional view, taken substantially in the plane of the line 17—17 in Figure 16.

Like characters of reference are employed to designate like parts in the specification and throughout the several views.

Referring now to the accompanying drawings in detail, more particularly to Figures 1-5 thereof, the invention is embodied in a dispensing cap designated generally by the reference character 20, the same embodying in its construction a cap member 22 which is adapted to be positioned on the mouth of a suitable container, such as for example, a bottle 24, the cap member 22 having a circular top wall formed with an eccentrically disposed outlet opening 26 while a circular closure plate 28 is rotatably mounted on the top wall of the cap member by a centrally disposed pivot pin or rivet 30, as will be clearly apparent.

It will be understood from the foregoing that the closure member 28 may be rotated from an open position shown in Figure 1 to a closed position shown in Figure 3, rotation thereof being effected by a laterally projecting finger piece 32 which is secured to the closure member 28 and is engageable with upwardly projecting stop pins 34 provided on the cap member 22 so as to prevent excessive rotation of the closure member, that is, beyond its open and closed positions.

A substantially semi-cylindrical collecting trough or duct 36 is secured to the cap member 22 in register with the outlet opening 26 and is adapted to project inwardly into the bottle 24, while one or more guiding rods 38 are secured to the inner surface of the top wall of the cap member 22 immediately adjacent the duct 36 (see Figure 2), so that when the bottle is inverted to a position shown in Figure 4, the guiding element or elements 38 will assist the tablets or capsules 40 in the bottle in gravitating into the duct 36 and outwardly through the outlet opening 26, assuming of course that the finger piece 32 has been manipulated so as to place the closure member 28 in its open position.

It is to be understood that the closure member 28 is provided with an outlet opening 42 which, of course, is registerable with the opening 26 when the closure member is in its open position, and a substantially semi-cylindrical outlet passage or duct 44 communicates with the opening 42 and projects outwardly from the closure member 28, into which outlet passage the capsule is discharged after passing through the openings 26, 42, as shown in Figure 4.

A substantially annular, slightly resilient keeper element 46 has a substantial portion thereof secured to the outlet passage 44 and prevents the capsule in the outlet passage from becoming laterally displaced, while a substantially L-shaped capsule retaining element 48 is secured at one end thereof to the cap member 22 and extends over the outlet passage 44 when the closure member 28 is in its open position, so that the capsule cannot drop out of the outlet passage when the device is in the position shown in Figure 4. However, when the finger piece 32 is actuated so as to close the closure member 28, the outlet passage 44 is moved away from the keeper element 48, that is, to the position shown in Figure 4, so that the capsule may be readily discharged from the outlet passage. It is to be noted that by virtue of this arrangement only one capsule may be dispensed at one time, that is, during each actuation of the closure member 28.

Referring now to the modified embodiment of the invention illustrated in the accompanying Figures 6-11 inclusively and designated generally by the reference character 60, the dispensing cap member 62 herein is provided with an outlet opening 64 and with a rotatable closure member 66, the corresponding outlet opening 68 in the closure member again being provided with an outlet passage 70 which is covered by a retaining element 72 when the closure member is in its open position, which has been already described in connection with the embodiment 20.

A tablet collecting duct 74 is secured to the inner surface of the cap member 62 in register with the outlet opening 64, but in this instance the capsule guiding elements 76, that is, the elements which assist the capsules in the bottle in dropping into the duct 74, are provided on an agitator plate 78 which, in turn, is rigidly secured to an actuating pin 80 which is slidable through the cap member 62.

The pin 80, in addition to carrying the agitator plate 78, also functions as a pivot for the rotatable closure member 66, and it is to be noted that a suitable compression spring 82 is provided on the pin for the purpose of urging the agitator plate 78 toward the top wall of the cap member 62.

Rotation of the closure member 66 is effected by a suitable finger piece 84 which is movable between a pair of stops 86, it being noted that the latter are configurated so that they slidably engage the outer surface of the closure member 66 and thereby prevent the latter from lifting away from the top wall of the cap member 62. If desired, an additional element 88, similar to the stops 86, may be secured to the cap member 62 to assist the stops in retaining the closure member against the cap member.

When this embodiment of the invention is placed in use, the bottle 24 may be inverted as shown in Figure 6, and by simply pressing the pin 80 inwardly, the agitator plate 78 and the agitating elements 76 will be actuated so as to urge the capsules in the bottle into the collecting channel or duct 74, so that they may be ultimately discharged through the openings 64, 68 into the outlet passage 70, as in the embodiment already described.

While the embodiments 20, 60 are primarily intended for use in dispensing substantially spherical, cylindrical or oval tablets or capsules, the further modified embodiment of the invention which is designated generally by the reference character 100 and is illustrated in the accompanying Figures 12-17 inclusively, is intended primarily for use with oval capsules or rectangular tablets.

The dispensing cap 100 includes a cap member 102 and a closure member 104, the tablet collecting duct 106 which is secured to the cap member and the outlet passage 108 which is secured to the closure member being, in this instance, of a substantially rectangular cross section, although the collecting duct 106 is open-sided, as is best shown in Figure 17, so that the tablets may readily enter the same.

In this embodiment of the invention an agitator plate 110 is provided in the cap member 102 and is secured to an actuating pin 112, the latter also functioning as a pivot for the rotatable closure member 104. It is to be noted that the agitating plate 110 is provided with a cut-out or recess 114 so as to facilitate clearance for the collecting duct 106 (see Figure 17), while a capsule guiding element or post 116 projects downwardly from the agitating plate 110 at a point adjacent the collecting duct 106, as is best illustrated in Figures 15, 16 and 17.

The finger piece 118, stops 120, keeper 122 and the retaining element 124 in this embodiment correspond in structure and function to the respective elements 84, 86, 88 and 72 in the embodiment 60.

It is believed that the advantages and use of the invention will be clearly apparent from the foregoing disclosure and accordingly, further description thereof at this point is deemed unnecessary.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

1. A dispensing cap for containers comprising a cap member adapted to be secured to the mouth of a container, said cap member having an outlet opening therein, a cover plate having a passage therein, said cover plate being disposed on the top of said cap member, an agitator plate underlying said cap member and movable inwardly thereof, actuating means carried by said agitator plate and extending outwardly of said cap member, said cover plate being rotatably disposed on said actuating means whereby said passage is selectively registerable with said opening, a collecting duct carried by said cap member in registry with said opening and extending inwardly of said cap member, said agitator plate being movable in a path parallel to said collector duct, said agitator plate having a recess therein for receiving said collector duct whereby said agitator plate is prevented from rotating.

2. A dispensing cap for containers comprising a cap member adapted to be secured to the mouth of a container, said cap member having an outlet opening therein, a cover plate having a passage therein, said cover plate being disposed on the top of said cap member, an agitator plate underlying said cap member and movable inwardly thereof, actuating means carried by said agitator plate and extending outwardly of said cap member, said cover plate being rotatably disposed on said actuating means whereby said passage is selectively registerable with said opening, a collecting duct carried by said cap member in registry with said opening and extending inwardly of said cap member, said agitator plate being movable in a path parallel to said collector duct, said agitator plate having a recess therein for receiving said collector duct whereby said agitator plate is prevented from rotating, article guide means carried by said agitator plate for movement therewith, said guide means being disposed adjacent said collector duct to guide an article therein.

3. A dispensing cap for containers comprising a cap member adapted to be secured to the mouth of a container, said cap member having an outlet opening therein, a cover plate having a passage therein, said cover plate being disposed on the top of said cap member, an agitator plate underlying said cap member and movable inwardly thereof, actuating means carried by said agitator plate and extending outwardly of said cap member, said cover plate being rotatably disposed on said actuating means whereby said passage is selectively registerable with said opening, a collecting duct carried by said cap member in registry with said opening and extending inwardly of said cap member, said agitator plate being movable in a path parallel to said collector duct, said agitator plate having a recess therein for receiving said collector duct whereby said agitator plate is prevented from rotating, article guide means carried by said agitator plate for movement therewith, said guide means being disposed adjacent said collector duct to guide an article therein, common means yieldingly biasing said agitator plate and said cover plate into engagement with said cap member.

WAYNE A. WARD.

References Cited in the file of this patent

UNITED STATES PATENTS

| Number | Name | Date |
|---|---|---|
| 1,046,957 | Brehm | Dec. 10, 1912 |
| 1,174,828 | Copeland | Mar. 7, 1916 |
| 1,253,218 | Doremus | Jan. 15, 1918 |
| 1,373,973 | Richardson et al. | Apr. 5, 1921 |
| 1,414,502 | Case | May 2, 1922 |
| 1,792,763 | Ryan | Feb. 17, 1931 |
| 1,955,559 | Narrow | Apr. 17, 1934 |
| 1,974,332 | Hauck | Sept. 18, 1934 |
| 1,987,578 | Ower et al. | Jan. 8, 1935 |
| 2,019,916 | Leasley | Nov. 5, 1935 |
| 2,038,371 | Lemoine | Apr. 21, 1936 |
| 2,204,821 | Priddy | June 18, 1940 |
| 2,219,422 | Jordan | Oct. 29, 1940 |
| 2,278,949 | Sabini | Apr. 7, 1942 |

FOREIGN PATENTS

| Number | Country | Date |
|---|---|---|
| 1,186 | Great Britain | of 1888 |